Nov. 20, 1951 H. J. NICHOLS 2,575,357
REMOTE CONTROL AND ANSWER-BACK SYSTEM
Filed Sept. 26, 1945 5 Sheets-Sheet 1
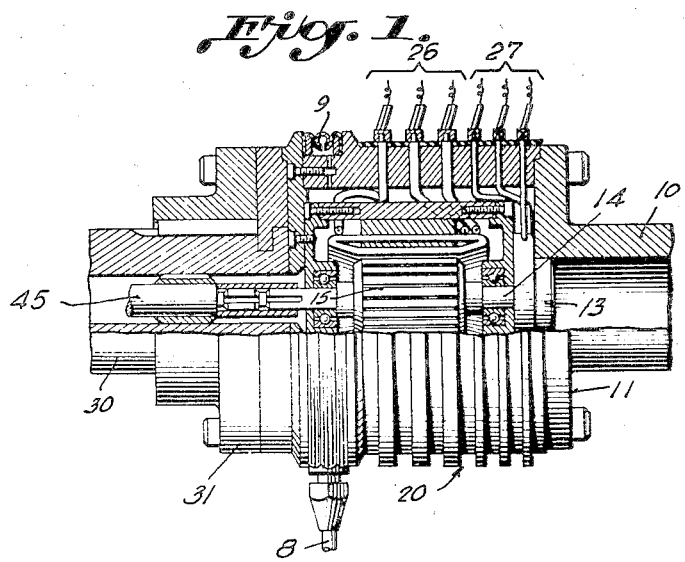
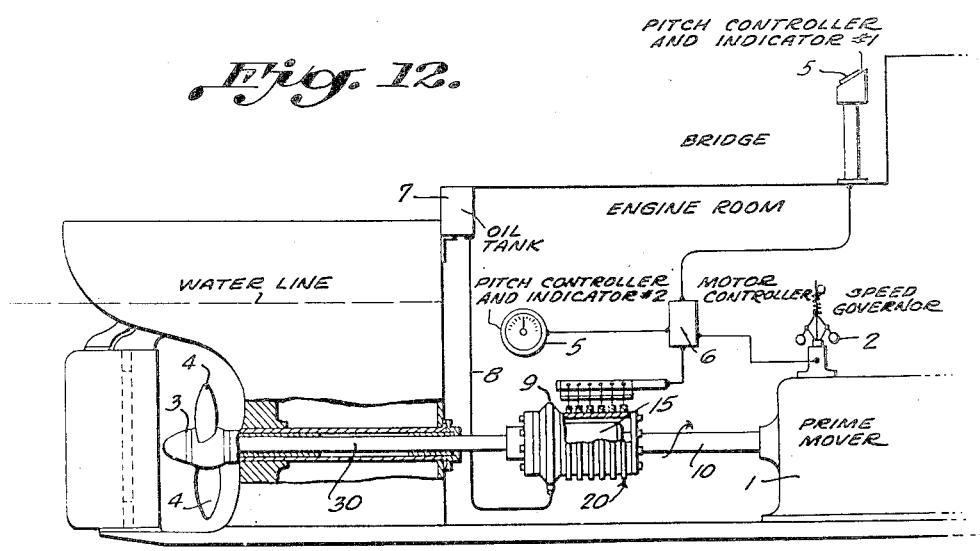
INVENTOR
HARRY J. NICHOLS Nov. 20, 1951 H. J. NICHOLS 2,575,357
REMOTE CONTROL AND ANSWER-BACK SYSTEM
Filed Sept. 26, 1945 5 Sheets-Sheet 2
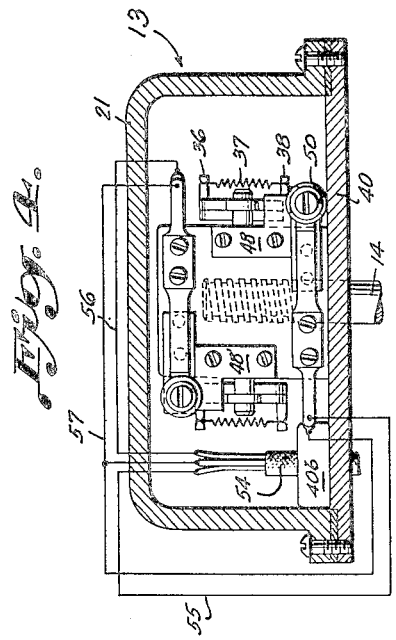
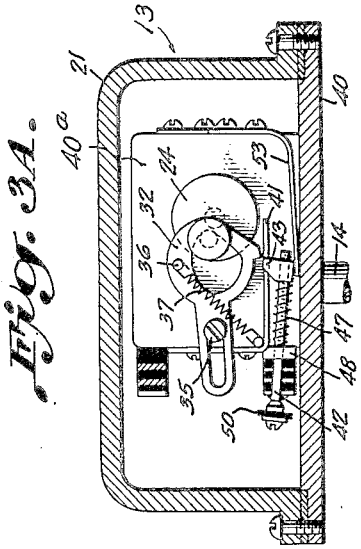
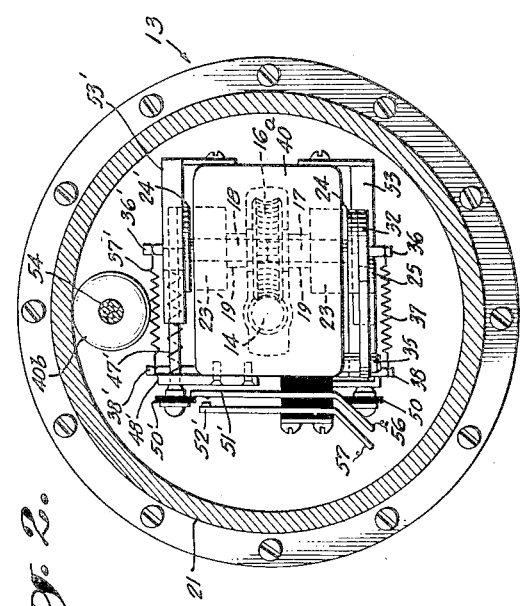
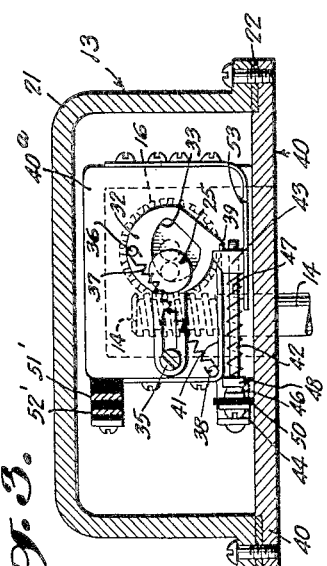
INVENTOR
HARRY J. NICHOLS
BY
Emery Holcombe & Blair
ATTORNEYS

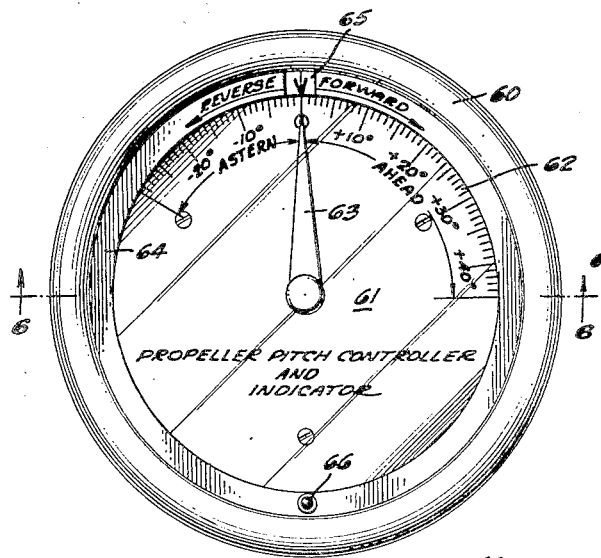
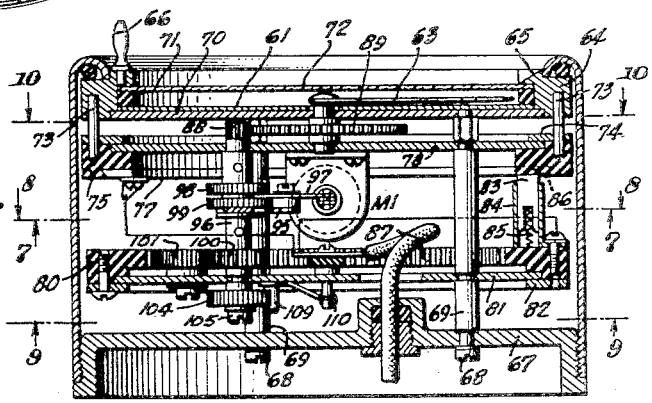

Inventor
HARRY J. NICHOLS

Nov. 20, 1951            H. J. NICHOLS            2,575,357

REMOTE CONTROL AND ANSWER-BACK SYSTEM

Filed Sept. 26, 1945            5 Sheets-Sheet 5

INVENTOR
HARRY J. NICHOLS
BY
ATTORNEYS

Patented Nov. 20, 1951

2,575,357

UNITED STATES PATENT OFFICE 2,575,357

REMOTE CONTROL AND ANSWER-BACK SYSTEM

Harry J. Nichols, New York, N. Y.

Application September 26, 1945, Serial No. 618,643

5 Claims. (Cl. 318—31)

This invention relates to a remote control and answer-back system, and will be described in its application to controllable and reversible pitch marine propellers, although it is to be expressly understood that the invention has application to controllable pitch propellers for aircraft, and to angle indicating and controlling systems generally.

In all true controllable pitch propeller systems, means are required to control the propeller pitch actuating mechanism to set the blade pitch at will, or to vary the pitch automatically. The ultimate controlling agent may be an operator, or some automatic device such as a speed governor. It is highly desirable to provide in all pitch control systems means for indicating the pitch accurately reliably and automatically at one or more remote control stations. For controllable and reversible pitch marine propellers, this feature may be regarded as an essential, since such propellers are used for maneuvring purposes, and it is vital for such purposes that the pilot should know the exact pitch merely by glancing at a suitable indicating instrument.

The prior art shows numerous examples of mechanical and electrical pitch controlling and pitch indicating devices, but such devices have been generally characterized by complexity, lack of reliability, the necessity of transmitting mechanical movements through cumbersome and complicated systems of levers, wires, sprockets, etc.; hydraulic telemotor systems; involved electro-mechanical systems, and other disadvantages and defects which have limited their practical use.

It has heretofore been proposed in connection with electro-mechanical actuating mechanisms for varying the pitch to utilize the angular differential motion between the propeller shaft and some rotary part of the pitch actuating mechanism to drive a mechanical or electrical differential device, thereby to obtain pitch indication and follow-up motion for control purposes. It has also been proposed to utilize the relative angular differential rotation between the rotating element of a stationary motor driving the pitch actuating mechanism and that of the propeller shaft, in the same manner and for the same purposes. It has also been proposed to utilize a motion of translation of some part of a mechanical or hydraulic pitch actuating mechanism as the motional basis for a pitch indication and follow-up system.

The angle indicating and control system of the present invention departs from all known types of angle indicating and follow-up systems in that, as hereinafter explained, the basis of angular measurement for pitch indicating and follow-up control purposes is the differential count, by electro-mechanical means, or discrete uniform electrical pulses each representing the completion of a certain number of revolutions, in one or the other direction, of the actuating motor, the rotary driving element of which motor is positively connected by mechanical means to rotate the controlled member.

It is accordingly a major object of the present invention to overcome the disadvantages and defects of angle indicating and control systems of the prior art by providing a novel remote-control and angle indicating system of answer-back type of marked simplicity, and of inherent reliability, permanency of adjustment, and practicality, including minimal installation and maintenance costs.

Another object is to provide an electrical impulse transmitter, and an electro-mechanical pulse counter controlled thereby, for sending and utilizing electrical control impulses representing the differential revolutions of the rotary element of the actuating motor with absolute accuracy over an indefinite period, that is, without cumulative errors during repeated reversals, switching operations, accelerations, shut-downs, etc.

Another object is to provide an electrical impulse transmitter which will infallibly produce uniform control impulses independently of the rotational speed of the actuating motor, and which cannot be brought to rest in impulse transmitting condition, even though the motor is operated without regard to the condition of the impulse generator; that is, whether or not the electrical circuits of the impulse transmitter are connected to current when the motor is started, stopped, reversed, or shut down.

A further object is to provide a combined pitch indicating, pitch controller, and automatic follow-up remote control device in a compact unitary instrument which can be easily and accurately manipulated to pre-set the pitch quickly to any desired setting within the operating range, thereby to facilitate maneuvring and other pitch control operations.

A still further object is to provide a combined pitch indicating and manual-automatic control system in which the system can be switched over from operator to automatic control or vice-versa, merely by actuating a simple switch.

Other objects and advantages of the invention will be pointed out in the following description and claims and illustrated in the accompanying drawings, which disclose, by way of example, the principles of the invention and the best mode which has been contemplated of applying those principles.

In the drawings:

Fig. 1 is a side elevation in partial axial section of a unitary shaft coupling, including a pitch varying motor and the novel transmitter forming part of the invention.

Fig. 2 is an internal plan view of the transmitter shown in Fig. 1, disclosing the mechanism therein, the cover being shown in transverse section.

Fig. 3 is a front view of the interior of the same transmitter, the cover therefor being in median section.

Fig. 3A is a view similar to that of Fig. 3 but illustrates a following stage of operation of the mechanism.

Fig. 4 is a left side view of the interior of the transmitter, with particular reference to the electrical details.

Fig. 5 is a plan view of the face of the novel pitch indicator and controller instrument of the invention.

Fig. 6 is a longitudinal section in part of the pitch controller of Fig. 5 taken on line 6—6 of that figure, disclosing various internal details of that instrument.

Fig. 7 is a transverse section of the controller of Fig. 6 as viewed upwardly from the plane indicated by line 7—7 of that figure.

Fig. 12 is a schematic diagram illustrating a typical installation of the pitch control system of the invention.

Figure 8:
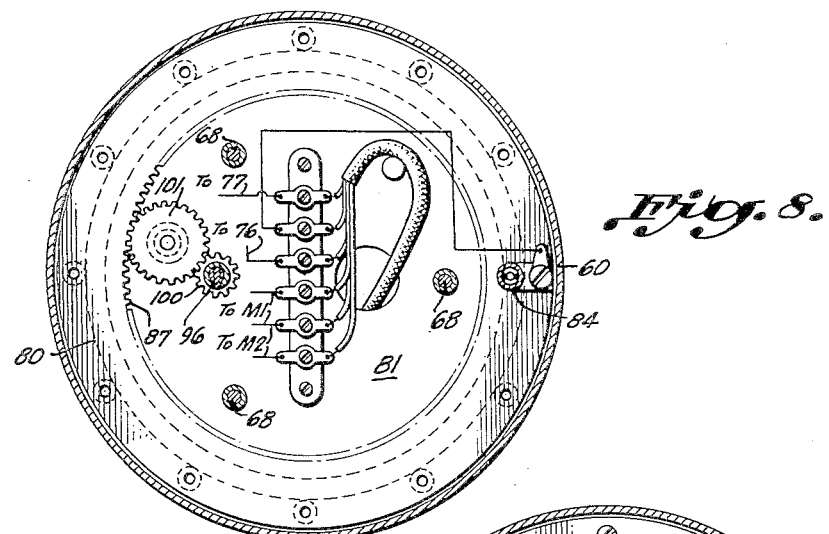
Fig. 8 is a similar section but viewed downwardly from the same plane as indicated by arrows 8—8 of Fig. 6.

While my present invention is applicable to controllable pitch propellers of various types, as an example of a typical practical installation, and referring now to Fig. 12, I show diagrammatically a marine controllable pitch propeller system of a vessel including a prime mover 1 having a power output shaft 10 connected by a shaft coupling 20 to drive a propeller shaft 30. Mounted outside the vessel on the outboard end of propeller shaft 30 is a hub 3 having blades 4 turnable about their own axes therein. Positive torque amplifying mechanism TA carried by the pitch changing hub and propeller shaft is operatively connected to the blades to turn them about their own axes in unison for pitch varying purposes. A reversible electric motor 15 mounted inside shaft coupling 20 (see Fig. 1) drives the pitch changing mechanism in one rotary direction or the other to vary the pitch accordingly. One or more remote pitch controller and indicator instruments 5, located for example on the bridge and in the engine room as indicated, are provided to control the pitch as desired, and to indicate the blade pitch angle visually. A motor controller 6 is operatively connected to the pitch controller and indicator 5 and to the motor 15, as hereinafter described, to energize the motor as required to vary the pitch in the direction and degree desired. Means are also provided for operatively connecting an automatic pitch regulating device, such as a prime-mover speed governor 2, to the pitch control system as an alternative to manual control of the pitch variation.

While not a part of the present invention, the diagram also shows means comprising an oil tank 7 elevated above the water line, piping 8 and rotary shaft sealing means 9 to supply lubricating and cooling oil to the motor 15 and to the pitch changing mechanism carried by coupling 20, propeller shaft 30, and hub 3.

Referring now to the drawings in detail and particularly to Fig. 1, a preferred construction of the driving end of a controllable-pitch propeller system, chosen as an example for purposes of illustration, is shown as comprising a hollow main drive shaft 10, as for example the shaft of an engine or other propulsion prime mover, having an annular flange 11 at the power output end, and a propeller shaft 30 having mounted thereon a flange 31; the two flanges being connected in driving relation by a unitary shaft coupling 20 in which is housed a pitch changing motor 15, and an electrical impulse transmitter 13 to be described in detail hereinafter.

A preferred type of unitary shaft coupling, of a controllable pitch propeller hub mounted on the propeller shaft 30, and of a blade actuating mechanism housed in the propeller hub and shaft 30, and all other related details, are shown and described in my copending patent application Serial No. 635,509, filed December 17, 1945, hence it is deemed sufficient for present purposes to point out some of the pertinent main features of Fig. 1 as follows:

The motor 15, mounted inside the unitary shaft coupling 20, is preferably a three-phase, squirrel-cage induction motor supplied with operating current via the three external conductors 26, and the associated brushes, slip rings, and internal conductors; while electrical connections to transmitter 13 are provided by the three external conductors 27 and the associated brushes, slip rings, and other internal conductors, as indicated. The rotor shaft of motor 15 is extended towards the propeller shaft to drive a torque shaft 45 by means of the splined sleeve coupling shown. The rotor shaft is also extended towards the main drive shaft to form a worm-shaft 14 (see Figs. 2 and 3) extending into and driving the worm gear 16 of transmitter 13 as hereinafter described. Transmitter 13 is secured to the frame of motor 15 by means not shown, and hence rotates bodily with motor 15, drive shaft 10, and propeller shaft 30. It is also to be noted that torque shaft 45 is assumed to be positively connected by suitable torque amplifying, speed reducing mechanism to the blades to vary the pitch of same, as disclosed in the copending application referred to above. Hence each revolution of the motor shaft in one direction or the other produces a micrometric definite change in the blade pitch angle, the pitch-changing mechanism in this sense being the equivalent of a high-ratio micrometer. It follows that by accurately counting the differential revolutions of the motor shaft, the pitch angle of the blades can be determined to a high degree of precision at all times.

For present purposes, it can be assumed that the speed reduction ratio of the motor revolutions to the axial revolutions of the blades is 3600 to 1; that is, 3600 revolutions of the motor in one direction will produce one complete axial revolution of the blades, hence one revolution of the motor shaft represents 1/10 degree of pitch angle of the blades. Therefore, one degree of pitch angle is represented by ten revolutions of the motor shaft. Accordingly, by selecting a speed reduction ratio of 10 to 1 for the worm drive of the transmitter, one revolution of the worm gear 16 will represent one degree of pitch change of the blades, and this speed ratio is here assumed for illustrative purposes.

Referring now to Fig. 2, that figure shows in transverse section details of mechanism of the electrical transmitter 13, in which the worm portion of motor shaft 14 is shown in transverse outline in the center of that figure. Worm 14 drives worm gear 16 of the transmitter at a suitable reduced speed ratio, here assumed to be 10:1, to suit the desired over-all angle ratio or scale factor of the pitch indicating system.

Referring now to Figs. 2 to 4 inclusive, the main structural members of the transmitter comprise the base 40, having an internal well 40a adapted to receive worm 14 and worm gear 16, and a closed cover 21 which is assembled tightly to the base by clamp flanges and screws as shown, a gasket 22 being clamped between the flanges to provide an air-tight and oil-tight joint. Worm gear 16 is provided with a hub in which two similar shafts 17, 18 are secured tightly by means of a press fit, as shown. The mechanisms driven by the two shafts are identical, hence to simplify the description the parts associated with shaft 18 are designated by prime numbers corresponding to similar parts associated with shaft 17. Shafts 17, 18 are rotatably mounted in the walls of well 40a in base 40 by sleeve bearings 19, 19' and passage of oil along the shafts beyond bearings 19, 19' is prevented by oil seals 23, 23' of any desired type, these parts being of commercial type and hence are shown only in outline. On the out-board end of each shaft is mounted a crank disc 24 having a short, flat-headed crank pin 25. An oscillatory member 32, termed the banjo, or banjo form and having a slotted arm and a central sector-shaped opening, or internal cam 33, is pivotally and slidably mounted on a fixed pivot 35 by a screw as shown, and moves flat against crank disc 24 in operative relation with crank pin 25, the construction being such that when shafts 17, 18 rotate the interaction of crank pin 25 and internal cam 33 produces a combined oscillatory and reciprocating motion of banjo 32, this motion being further modified by a tractile spring 37 as described hereinafter.

A spring support pin 36 is mounted near the rim of the circular portion of banjo 32, and a spring anchor pin 38 is fixed in a suitable position on the base, while therebetween is stretched a tractile spring 37, termed the pawl spring, whose combined function is to provide a limited degree of control to the motion of the banjo and also to provide a resilient propelling force to actuate the spring-loaded trip device as hereinafter explained.

Banjo 32 is provided with a peripheral finger 39, termed the pawl, adapted to engage a fixed, slotted sear member 41 mounted on the base for purposes presently to be explained. A bolt 42, having a follower member or trigger 43 in the form of a special nut assembled on the end of the bolt, is slidably mounted through a hole in stationary plate 48 secured to base 40 and is provided with a slotted head 44 on which a washer insulator 50 is mounted by tight collar 46. A light compression spring 47, termed the bolt spring, is assembled over the stem of bolt 42 between the trigger 43 and plate 48. A spring finger 53 flexibly retains trigger 43 in contact with sear member 41. A pair of normally open, self-closing spring contacts are mounted on base 40, but insulated therefrom, in position to be acted upon by insulator 50; resilient tongue 51 being the movable member of the pair, while back contact 52 is the stationary member of the pair. Normally, washer 50 presses against tongue 51 to hold the contacts open, but when washer 50 is thrust away by the trigger device, the contacts are closed by the resilience of tongue 51.

The mechanism just described, which is mounted on three sides of the exterior of the well portion of base 40, is duplicated for operation by shaft 18. It is to be noted, however, that banjo 32' is assembled in inverted relation to banjo 32, hence operates in reverse manner to banjo 32.

Referring now to Figs. 2 and 4, the base 40 is formed with an internal boss 40b to provide entrance for a three conductor cable 54, a suitable packing and packing nut also being provided to furnish an air-tight entrance seal for the cable, as indicated. Two of the cable conductors, designated by 55 and 56, are connected with the tongues 51 and 51', respectively, while the third conductor 57 is connected to back contacts 52 and 52' in common, these connections being merely indicated for clarity.

Referring now particularly to Figs. 3 and 3A, the operation of the transmitter mechanism is as follows: Assuming that crank disc 24 is rotating clock-wise, and that this disc has previously rotated to bring the banjo 32 into the position shown in Fig. 3, the pawl 39 is caught on the end of slotted sear 41 and is also in engagement with the trigger 43 carried by bolt 42, the toe of which trigger rides in the slot of sear 41. Further, that tractile spring 37 is stronger than compression spring 47 at all stages of operation. Then as disc 24 continues in rotation clock-wise, crank pin 25 engages the top arc of internal cam 33, thereby lifting the body of banjo 32 upwardly. As this lifting motion continues, pawl 39 is lifted clear of sear 41, but not of trigger 43. Thereupon spring 37 snaps the banjo to the left, pushing trigger 43 to the left along the bottom of sear 41, and thrusting bolt 42 to the left (see Fig. 3A) whereupon insulator washer 50 relaxes its pressure on tongue 51, enabling the contacts to close, thereby closing the associated external electrical circuit (which includes a current source and a magnet winding of the electrical receiver hereinafter described) to send a distinctive electrical control pulse hereinafter termed a forward pulse.

Referring particularly to Fig. 3A, near the end of the stroke of pawl 39, the slanting surface of the toe of trigger 43 intercepts the downwardly sloping end of the slot in sear 41, thereby unlatching the trigger from the pawl. (Fig. 3A is drawn to show the instant of unlatching the trigger from the pawl.) Thereupon, compression spring 47 gains control of the bolt and snaps it bodily to the right, returning washer 50 into restraining engagement with tongue 51 and breaking the electrical circuit at the contacts, thereby terminating the forward pulse.

It will be noted that the circuit closing and opening procedure described will take place whenever the trip device has been cocked and the pawl is tripped from the sear, even if the shaft should stop at that precise instant; hence a discrete pulse would be sent and the circuit again broken under those circumstances. This feature ensures an open line condition regardless of any rest position of the rotor of motor 15, and eliminates any possibility of damage to the magnet windings due to abnormally prolonged current, such as might occur in the absence of this feature. It is also to be noted that the duration of the pulse is not a function of the shaft speed, but of the relative spring forces and masses of the banjo and bolt. It will be evident that by properly balancing these forces and masses to establish the desired pulse duration when the motor is running at full speed, substantially the same duration will be obtained at all lesser motor speeds. This gains the important operational feature of providing operating pulses whose duration is independent of the motor speed, thereby promoting operating uniformity and reliability. It is to be further noted that the contacts are actuated with a snap action, which is an important factor in reducing arcing and securing long contact life. The trip device also eliminates bouncing contacts and enables precious metal contacts to be used economically, thereby promoting economy in first cost and maintenance, and long trouble-free operating life.

As disc 24 continues in rotation clock-wise from the position shown in Fig. 3A, the crank pin 25 picks up the banjo 32 and carries its head upwardly in an arc to the right, and then downwardly, thereby restoring the pawl to the locked position shown in Fig. 3. After the pawl is dropped to locked position, an idle interval occurs, during which the crank pin first travels down the sloping surface of the internal cam, pulling the pawl slightly beyond the sear end and enabling trigger 43 to settle firmly in engagement with the pawl (ensuring certain recocking of the trip device); after which the crank pin moves freely along the third quadrant arc of the cam until striking the top arc of the cam to trip the pawl as described. It will be noted that the wear on the crank pin due to sliding action on the cam is well distributed, and that the cam engagements are gradual, thus promoting a long operating life—which it will be appreciated is a highly important practical consideration in apparatus of this class.

Similar step-by-step analysis will show that should the disc 24 be assumed to rotate in reverse (counterclockwise) the trip device will not be operated; for in that case the crank pin will lift the pawl upwardly and to the right away from the sear and trigger, and will deposit the pawl in the position shown in Fig. 3A without tripping the trigger. Should counterclockwise rotation continue, the trigger will be oscillated against the spring finger 53 when the pawl passes over the trigger, but this oscillation has no component tending to release the tongue 51 from restraint by washer 50. Hence it is apparent that the trip device is operable only for one direction of rotation of the actuating shaft, and can only be operated once for each complete rotation of that shaft in the proper direction. The device described thus sends pulses which infallibly represent complete revolutions in one direction of the actuating shaft. It follows that there can be no accumulation of fractions of revolutions, no matter how often the rotation is reversed. Further, that no false pulses can be produced when the current supply is shut off and switched on. This eliminates a troublesome source of cumulative and fugitive calibration errors to which some pitch indicating systems have been subject.

Since the banjo and other operating elements of the trip mechanism associated with shaft 18 are assembled in inverse relation to that shaft, it follows that the pulses generated by that part of the mechanism will represent the counter-clockwise revolutions of the worm shaft and the motor rotor, and ultimately, a reverse pitch change hence these pulses are termed reverse control pulses. The differential pulses sent by the two trip mechanisms of the transmitter can therefore be utilized to actuate a suitable differential pulse counter, as will now be described, thereby to indicate continuously the pitch angle of the blades.

Referring now to Fig. 5, which shows the face of the novel unitary combined pitch controller and indicator instrument of the invention, the instrument case 60 houses the indicating and control mechanism, of which this view discloses the glass covered dial 61 bearing a graduated scale 62 showing the pitch angle in degrees as measured from a stationary index line, or zero line "0," denoting the neutral pitch of the propeller blades. The scale is marked in negative degrees to denote negative settings of the pitch, this range being labelled "Astern"; and in positive degrees to denote positive setting of the pitch, this range being labelled "Ahead." A pointer 63, shown in neutral position, indicates the blade pitch on the graduated scale of the dial, the actuating mechanism for the pointer under the control of the electrical transmitter being housed within the case. The dial is encircled with a rotatable ring 64, termed the pitch setting ring, having an index mark 65 and a manual operating knob 66 for presetting the pitch; and bearing markings "Reverse" and "Forward" with direction arrows to indicate the direction in which the setting ring is to be rotated to advance or to reverse the pitch. As will be explained more fully, when the setting ring is rotated so that the index mark 65 moves away from the pointer 63, the control apparatus for the pitch actuating motor is energized to vary the pitch accordingly. As the motor varies the pitch, the pitch indicator mechanism moves the pointer in the direction of and with the pitch change until the pointer again coincides with the index mark 65 on the setting ring, whereupon the motor current is cut-off by the control apparatus and the pitch set at that point. This provides an automatic follow-up feature. Stop means are provided inside the case to limit the rotation of the setting ring to the operating range of the pitch change.

It will be apparent that the arrangement just described provides an ideally simple manual control for the pitch combined with simple and readily comprehended pitch indication, in a single instrument.

Referring now to Fig. 6, which discloses the mechanism within the case 60 when the setting ring and the pointer are turned 90° clockwise to the full ahead position, that case is mounted on a base 67 by a screw joint as shown, or as may be desired. The base 67 supports the internal structural elements comprising a series of circular plates spaced apart by hollow pillars held in position by through bolts, as in the well known construction of clocks and instruments, two of such bolt and pillar assemblies being shown as indicated by 68 and 69. The top plate 70 supports the dial 61, which is secured thereon by small screws as seen in Fig. 5; and also at its edge supports setting ring 64, which has an annular ledge to center that ring on the top plate. A gasket 71 is placed between dial 61 and the glass cover plate 72. Setting ring 64 carries four pins 73 secured tightly therein, which pins extend downwardly into holes in support ring 74 and in segment ring 75, the latter of insulating material, such as a plastic composition. Segment ring 75 mounts two arcuate metal segments 76 and 77 (see Fig. 7) attached thereto by screws; and is rotatably mounted on second plate 78 in the same manner as the setting ring is mounted on the top plate. A second insulated ring 80, termed the brush ring, is similarly rotatably mounted on the bottom plate 81 by support ring 82. The brush ring 80 carries a brush 83, mounted in a brush holder 84, spring pressed against the segments by a light compression spring 85 to ensure continuous contact, in well known manner. It is apparent that with the construction described, the operator by rotating setting ring 64 will cause one or the other of the segments 76, 77 to ride over the brush 83, except at the null point between the segments, termed the null point 86, at which point (which corresponds in angular position with index mark 65 on the setting ring), the brush will ride on insulated segment ring 75, and thus be cut off from current. Likewise, when brush ring 80 is rotated by mechanism to be described, the brush 83 will ride along one or the other of segments 76, 77 except at the null point 86. Brush ring 80 has internal gear teeth 87 cut in its inner periphery for automatic actuation by mechanism next to be described.

Referring now to Fig. 7 in connection with Fig. 6, between the second plate 78 and bottom plate 81 is mounted electromagnetic mechanical mechanism for rotating the pointer 63 and the brush ring 80 responsively to electrical pulses received from transmitter 13. Two electro-magnets M1 and M2, preferably of solenoid type and mounted on plate 78, receive the pulses from transmitter 13 via electrical connections therewith; and it is assumed that magnet M1 receives the forward pulses indicating pitch change in the positive or forward direction, while magnet M2 receives the reverse pulses indicating pitch change in the negative or reverse direction. Magnets M1 and M2 actuate a reversible ratchet device comprising a bell crank 95, pivotally mounted on a shaft 96, and carrying a double pawl 97 pivotally mounted thereon and adapted to mesh alternatively with ratchet wheels 98, 99, of the same number of teeth (say 18 for example), but oriented in opposite directions. The plunger 91 of magnet M1 is connected by link 92 directly to double pawl 97, while plunger 93 of magnet M2 is connected by link 94 directly to bell crank 95. A tractile spring 102 retains bell crank 95 against stop 103, while a second weaker tractile spring 107 biases double pawl 97 towards crank 95. The ratchet mechanism operates as follows: When magnet M1 is energized by a forward pulse, plunger 91 is pulled into the winding and link 92 rotates double pawl 97 clock-wise (as view in Fig. 7), whereupon the lower pawl tooth engages a tooth of ratchet wheel 99 and advances that wheel one tooth pitch in clock-wise rotation; which results in pointer 63 being rotated clock-wise to indicate an increase of pitch. When magnet M2 is energized by a reverse pulse, plunger 93 is drawn into the winding and link 94 pulls bell-crank 95 in a clock-wise direction against the tension of tractile spring 102. However, in this case the lower pawl tooth is out of engagement with ratchet wheel 99, due to the biasing action of spring 107, and the upper pawl tooth slips over the next tooth of ratchet wheel 98 and engages the face thereof. Upon release of plunger 93 upon cessation of the actuating pulse, tractile spring 102 pulls the arm 95 back to the stop, rotating ratchet wheel 98 counter clock-wise, or in reverse, one tooth pitch; thus nullifying the previous stroke of plunger 91. It is thus seen that magnets M1 and M2 produce a differential count of the incoming differential pulses from transmitter 13; and rotate pointer 63 along the dial scale accordingly by means of pinion 88 fixed to shaft 96 and gear 89 fixed to pointer 63.

Referring now to Fig. 8 in connecton with Fig. 6, shaft 96 is also geared to the brush ring 80 in the following manner: Shaft 96 has fixed thereon a pinion 100 meshing with an idler pinion 101 which in turn meshes with internal gear 87 of brush ring 80. Due to the idler pinion, brush ring 80 is caused to move in the same direction and in unison with pointer 63. As an example of the necessary coordination of the gears and ratchet wheels to produce this result, since the ratchet wheels have eighteen teeth, one tooth pitch (the gain or loss due to the response of magnets M1 and M2 to a pulse from the pulsator, which pulse was assumed to represent one degree of pitch change) represents 20° of rotation of shaft 96. Also, it is to be noted that the dial scale is laid out so that 2 degrees of arc represent one degree of pitch change. Accordingly, the speed reduction ratios of the pointer gear train and of the brush-ring gear train should each be 20/2=10:1; as in the example illustrated.

Figure 9:
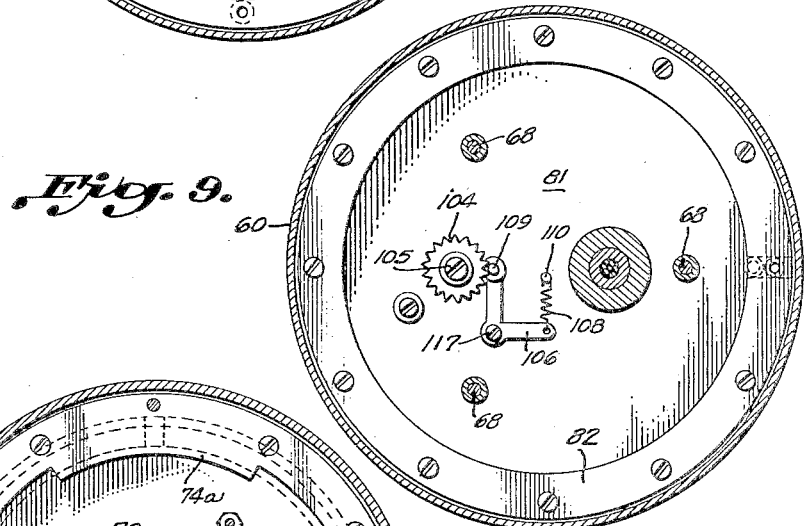
Fig. 9 is a similar section, as viewed upwardly from the plane indicated by lines 9—9 of Fig. 6.

Further to assure rigid accuracy of the pulse count and to assure accurate calibration of the pointer travel over the scale, degree by degree, an auxiliary star wheel registry device is provided. Referring to Fig. 9, which shows this auxiliary device as viewed from the bottom, a star wheel 104 having the same number of teeth as the ratchet wheels, that is eighteen teeth, is fixed on the end of shaft 96 by a set screw 105, as shown. A bell crank 106 is pivotally mounted on a shoulder screw 117 fixed to bottom plate 81. One arm of the bell crank carries a pivotally mounted roller 109 positioned to engage the teeth of star wheel 104, while a tractile spring 108 is mounted stretched between a fixed spring support stud 110 and the other arm of bell crank 106 to hold the roller in forcible engagement with the star wheel. The star wheel is tightened on shaft 96 by set screw 105 while the pointer 63 registers with a degree mark of scale 62 and in the relative position to roller 109 as shown in Fig. 9; whereupon the pointer will register with the dial marks at all other points, assuming the customary accuracy of layout of the scale markings, star wheel and gearing. Without further description, it will be evident that the auxiliary registry device shown will provide the desired accuracy of pointer indication; and also will assist the ratchet operation by presenting the ratchet teeth in predetermined uniform relation to the pawl teeth. The ratchet and star wheel registry devices described are known to operate with infallible accuracy and precision when properly constructed and adjusted, and thus materially aid in accomplishing the objects of the invention. Furthermore, these devices can be operated at high acceleration and speeds without missing count, in contrast with self-synchronous motor type repeaters which are inherently limited in these respects.

Figure 10:
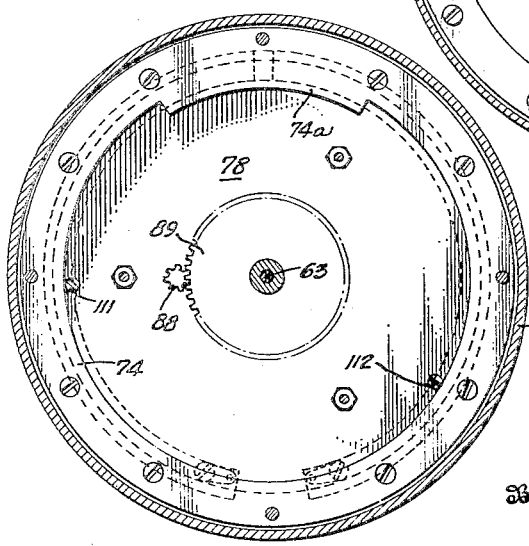
Fig. 10 is a similar section as viewed downwardly from plane 10—10 of Fig. 6.

In order to restrict the pitch setting operation to a predetermined operating range, thereby to eliminate any possibility of placing the propeller in an inoperative pitch, or of exceeding the proper operating range of the pitch actuating mechanism, a pitch limit arrangement is provided as follows: Referring to Fig. 10 which shows the mechanism from above as viewed from plane 10—10 of Fig. 6, the support ring 74 for segment ring 75 is provided with an internal stop arc 74a, while stop screws 111 and 112 are mounted in second plate 78 in suitable locations to limit the rotation of the setting ring 64 to the desired operating range. In this connection, the operating knob 66 of setting ring 64 is desirably made relatively small in size, to discourage violent or abusive operation of the setting ring.

Figure 11:
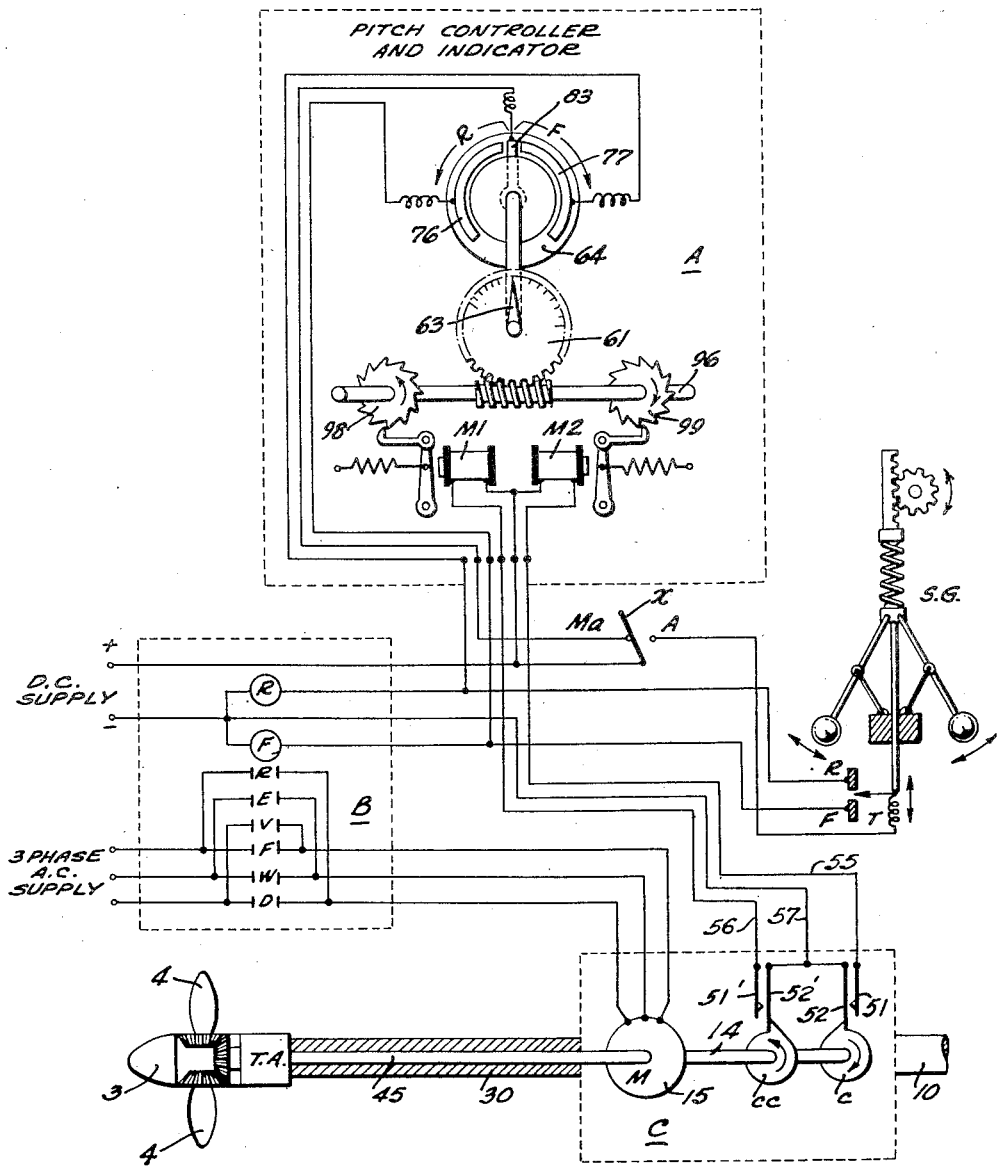
Fig. 11 is a schematic diagram illustrating the functional relations of the electro-mechanical elements of the system of the invention.

Reference is made to Fig. 11 which shows a schematic diagram illustrating the elements and over-all operation of the pitch indicating and control apparatus of the invention. The elements included in the pitch controller are shown in the outlined rectangle A, those in the motor controller in rectangle C, and those in the unitary coupling of Fig. 1 in rectangle B. An automatic pitch regulator, exemplified by a schematic speed governor SG, is also indicated and a typical manner of using such a regulator in connection with the pitch controller of the invention is shown. It is assumed that the controller is set at the neutral position, hence the motor M is stopped; also that the automatic manual selector switch X is thrown to the "Ma" or manual position. Incidentally, this would be a typical situation for a vessel ready to leave a dock, the engine being running, but the propeller turning idly, being in neutral pitch. Let it further be assumed that the propeller is to be set to a forward, that is a positive pitch, to go ahead. The setting ring 64 is accordingly rotated clock-wise in the direction indicated by the F arrow, say to +25°. Segment ring 75 is thus moved from neutral by an angle representing a 25° increase of pitch, carrying segment 76 a corresponding amount beyond the position of brush 83. A control circuit can then be traced out from plus (+) D. C. supply through the switch arm and contact Ma of switch X to brush 83, which is assumed to be in contact with segment 76, and thence back through contactor magnet F of controller B, and thence to the minus (—) D. C. supply. Contactor magnet F is thereby energized and closes the three group contacts FWD which apply A. C. to motor M, which latter is assumed to be phased to produce clock-wise rotation. When motor M starts in rotation, the unidirectional cam C, which represents the forward pulse sender in the transmitter 13 in coupling C as previously described, closes its associated contacts 51—52, thereby establishing a circuit from negative D. C. via contacts 51—52 to magnet M2, thence to positive D. C. thereby energizing M2. The cam contacts immediately open, as previously described, hence the current through magnet M2 is in the form of a pulse. Magnet M2 actuates its associated ratchet device to advance same one tooth, thereby causing pointer 63 and brush 83 to advance one scale graduation clock-wise, which is the direction in which segment 76 was advanced. Motor M continues in rotation, and successive pulses are sent to magnet M2 for every ten revolutions thereof in the clock-wise direction until the ratchet has advanced a total of twenty-five teeth, at which point pointer 63 comes into registry with index mark V of the setting ring, and brush 83 moves simultaneously onto the null insulation 86 between the segment ends. Current is thereby cut off from contactor magnet F of the motor controller, and group contacts FWD are thereby opened, cutting the current supply from motor M, which quickly stops. It is thus apparent that the pulse counter mechanism functions to indicate the pitch, and also to provide a follow-up movement of the brush 83 to cause the motor current to be cut off when the preset pitch has been attained. From the foregoing analysis, it becomes evident that when the setting ring is manually moved in the reverse direction, motor control circuits are similarly set up to energize contactor magnet R, thereby to reverse the phases and the motor rotation, whereupon unidirectional cam CC which represents the reverse pulse sender of the transmitter, sends pulses to magnet M1 thereby to rotate pointer 63 and brush 83 in a counterclock-wise direction, with resultant follow-up and motor cut-off as before.

By throwing switch X to the A position, the speed governor SG is put in charge to regulate motor M and the pitch automatically in the following manner: Governor contacts F and R are connected in parallel with segments 76 and 77, respectively, and the tongue contact T actuated by the governor now assumes the function of brush 83, except that the governor automatically provides the follow-up function; coming to neutral, as shown, when the speed of the prime mover equals the governor setting, which setting is controlled by well-known means indicated schematically in the figure.

It is to be noted, however, that the pitch indicating functions of the pitch controller are not disturbed, hence pointer 63 will continue to indicate the actual pitch continuously, and there is no need for adjustment or recalibration in shifting from manual to automatic pitch control, and vice-versa. It will also be noted that the motor controller and pitch indicator instruments have a common current supply, and should this supply be cut off, or fail, the motor will stop at once, leaving the pitch as then set. When the current supply is restored, the motor control and pitch indicator become concurrently effective. It is thus apparent that the arrangement of the invention is independent of switching and shutdown operations, and the pitch indicator calibration is not disturbed thereby. It will be appreciated that this is an important practical feature.

It is further to be noted that upon switching from automatic to manual operation, the pitch will be automatically returned to the existing setting of the pitch controller instrument. Should for any reason the pitch calibration be lost, it can readily be re-established in the following manner: With the engine driving the propeller, the pitch control is manipulated until the propeller is set to neutral; that is, until it does not deliver thrust in either direction. The difference between the pointer reading and the zero mark of the dial scale is then the measure of the calibration error. This can be corrected by pulsing magnet M1 or M2, as the case may be, while the motor current is cut-off, the number of times indicated by the calibration error, and then setting the index V of ring 64 to the zero mark of the dial scale. It is apparent that a special switch, having normally-open contacts in parallel with those of the pulsator, could be installed for pitch calibration purposes if desired.

In connection with pitch change limiting during automatic operation, it will be apparent to those skilled in the art that with the arrangements of the invention, the arc 74a and stops 111 and 112 described in connection with Fig. 10 can be insulated individually and used as contact members to energize an electrical alarm circuit to give visual and/or audible warning that the pitch limits have been reached. Such obvious additions or modifications based on the broad invention described should and are intended to come within the proper scope of the appended claims.

It will be evident to those skilled in the art that the pitch control and indicator apparatus described provides exceptional flexibility and versatility of control and that various control functions can be obtained by combining the control elements in various ways. Therefore, it is deemed unnecessary to describe the various switching arrangements by which these combinations can be effected.

Without further analysis the foregoing will so fully reveal the gist of this invention that others can, by applying current knowledge, readily adapt it for various applications without omitting certain features that, from the standpoint of the prior art, fairly constitute essential features of the generic or specific aspects of the invention, and therefore such adaptations and applications, should and are intended to be comprehended within the meaning and range of the equivalency of the following claims.

I claim:

1. In apparatus for controlling and indicating the angular position of a controlled rotary member, in combination, a reversible motor connected in positive driving relation to said rotary member; a controller for controlling said motor; pulse transmitting means including a pair of one-way rotary transmitter devices positively driven by said motor for producing discrete electrical control pulses of substantially uniform duration each representing one direction of rotation only and the completion of an integral number of revolutions of said motor in that direction; and a differential pulse counter device including a pair of electro-magnets operatively connected individually to said transmitter devices and actuated by said control pulses according to their algebraic sum, said counter device including a positively driven indicating element for indicating continuously the angular position of said controlled rotary member.

2. In apparatus for remotely controlling and indicating the angular position of a controlled rotary member positively driven by a reversible motor in predetermined reduced speed ratio, the combination of one-way pulse transmitting means including a pair of rotary transmitter devices positively driven by said motor and each adapted to produce automatically discrete electrical control pulses of substantially uniform duration each indicating the completion of a certain number of revolutions of said motor in one direction only, receiver means for said pulses including a differential counter device having a pair of electromagnets operatively connected so as to drive a visual angle indicator, and a pair of pulse transmission circuits each connecting one of said transmitter devices individually to one of said electromagnets.

3. In remote angle indicating apparatus, in combination, a controlled rotary member, pulse transmitting means including a pair of positively driven rotary transmitter devices each operative in one direction of rotation only for producing automatically uniform electrical control pulses each indicative of a certain angular displacement of said rotary member in one direction or the other, and receiver means including a differential counter device having a pair of electromagnets controlled individually by said control pulses for indicating the algebraic sum of said pulses, and angle indicating means including an indicating element positively driven by said differential counter device for indicating said sum in terms of the angular position of said rotary member.

4. A remote control and angle indicating system comprising power means positively driving a rotatable controlled member at the controlled station, pulse transmitter means at the controlled station including a pair of positively driven rotary transmitter devices for sending uniform electrical control pulses each indicative of one or the other direction of rotation and a certain unit of rotation of said controlled member; control means for said power means including a combined automatic follow-up controller and angle indicator at a control station comprising a settable contactor member, a driven rotatable contact member, a pair of electromagnetic devices actuated by said control pulses for driving said rotatable contact member in either direction, and angle indicating means driven by said electromagnetic devices; and a pair of pulse transmission circuits each operatively connecting one of said transmitter devices to one of said electromagnetic devices, said circuits being normally open only at said transmitter means.

5. A remote control and indicating system of answer-back type comprising in combination: a reversible motor positively driving a rotatable controlled member at the controlled station; a controller for said motor adapted to cause rotation of said motor in one direction or the other as desired; electrical pulse transmitting means at the controlled station including a pair of one-way rotary pulse transmitter devices positively driven by said motor, one of which devices is adapted to produce discrete electrical control pulses of substantially uniform duration each indicative of a certain number of revolutions of said motor in one direction only, and the other device similar pulses each indicative of an equal number of revolutions of said motor in the opposite direction, whereby said transmitting means sends discrete electrical control pulses each indicating the completion of a certain number of revolutions of said motor in one or the other rotary direction; a pulse counter device at a control station including a pair of electromagnetic devices actuated individually by said control pulses from one or the other of said transmitter devices, and an indicating device actuated by said electromagnetic devices according to the differential count of said control pulses and adapted to indicate the position of said controlled member accordingly; and a pair of pulse transmission circuits each operatively connecting one of said transmitter devices to one of said electromagnetic devices.

HARRY J. NICHOLS.

(References on following page)

REFERENCES CITED

The following references are of record in the file of this patent:

UNITED STATES PATENTS

| Number | Name | Date |
|---|---|---|
| 835,381 | Willard | Nov. 6, 1906 |
| 999,947 | Barnum | Aug. 8, 1911 |
| 1,018,765 | Janette | Feb. 27, 1912 |
| 1,778,077 | Holden | Oct. 14, 1930 |
| 1,788,793 | Hall | Jan. 13, 1931 |
| 1,811,578 | Florisson | June 23, 1931 |
| 1,961,671 | LeFevre | June 5, 1934 |
| 1,968,029 | Couch | July 31, 1934 |
| 2,018,364 | Jensen | Oct. 22, 1935 |
| 2,020,366 | MacCallum | Nov. 12, 1935 |
| 2,069,991 | Blanchard | Feb. 9, 1937 |
| 2,276,347 | Ruths et al. | Mar. 17, 1942 |
| 2,333,406 | Ballard | Nov. 2, 1943 |
| 2,377,633 | Kettering | June 5, 1945 |
| 2,393,189 | Richmond | Jan. 15, 1946 |
| 2,411,513 | Bergier et al. | Nov. 26, 1946 |

FOREIGN PATENTS

| Number | Country | Date |
|---|---|---|
| 185,754 | Germany | Apr. 29, 1907 |